United States Patent [19]
Nakada et al.

[11] 3,878,651
[45] Apr. 22, 1975

[54] MACHINE TOOL WITH REST APPARATUS

[75] Inventors: Shuichi Nakada, Anjo; Hiroshi Ota, Kariya; Tetsuo Matsuzaki, Nishio, all of Japan

[73] Assignee: Toyoda-Koki Kabushiki Kaisha, Kariya-shi, Aichi-ken, Japan

[22] Filed: Apr. 9, 1974

[21] Appl. No.: 459,315

[30] Foreign Application Priority Data
Apr. 11, 1973 Japan................................ 48-40986

[52] U.S. Cl............ 51/105 SP; 51/165.77; 51/238 S
[51] Int. Cl.............................................. B24b 5/42
[58] Field of Search......... 51/105 R, 105 SP, 165 R, 51/165.77, 238 S

[56] References Cited
UNITED STATES PATENTS
3,118,258  1/1964  Price .................. 51/105 SP
3,153,884  10/1964  Balsiger .............. 51/105 SP X
3,731,566  5/1973  Kurimoto ............. 51/238 S

*Primary Examiner*—Harold D. Whitehead
*Attorney, Agent, or Firm*—Oblon, Fisher, Spivak, McClelland & Maier

[57] ABSTRACT

A machine tool for uniformly performing machining operations on a plurality of portions of a workpiece wherein the machine tool is provided with a rest apparatus which supports the workpiece during the machining operations, and wherein the feeding cycle of the rest apparatus toward the workpiece is changed in accordance with the rigidity of the portions to be machined.

9 Claims, 6 Drawing Figures

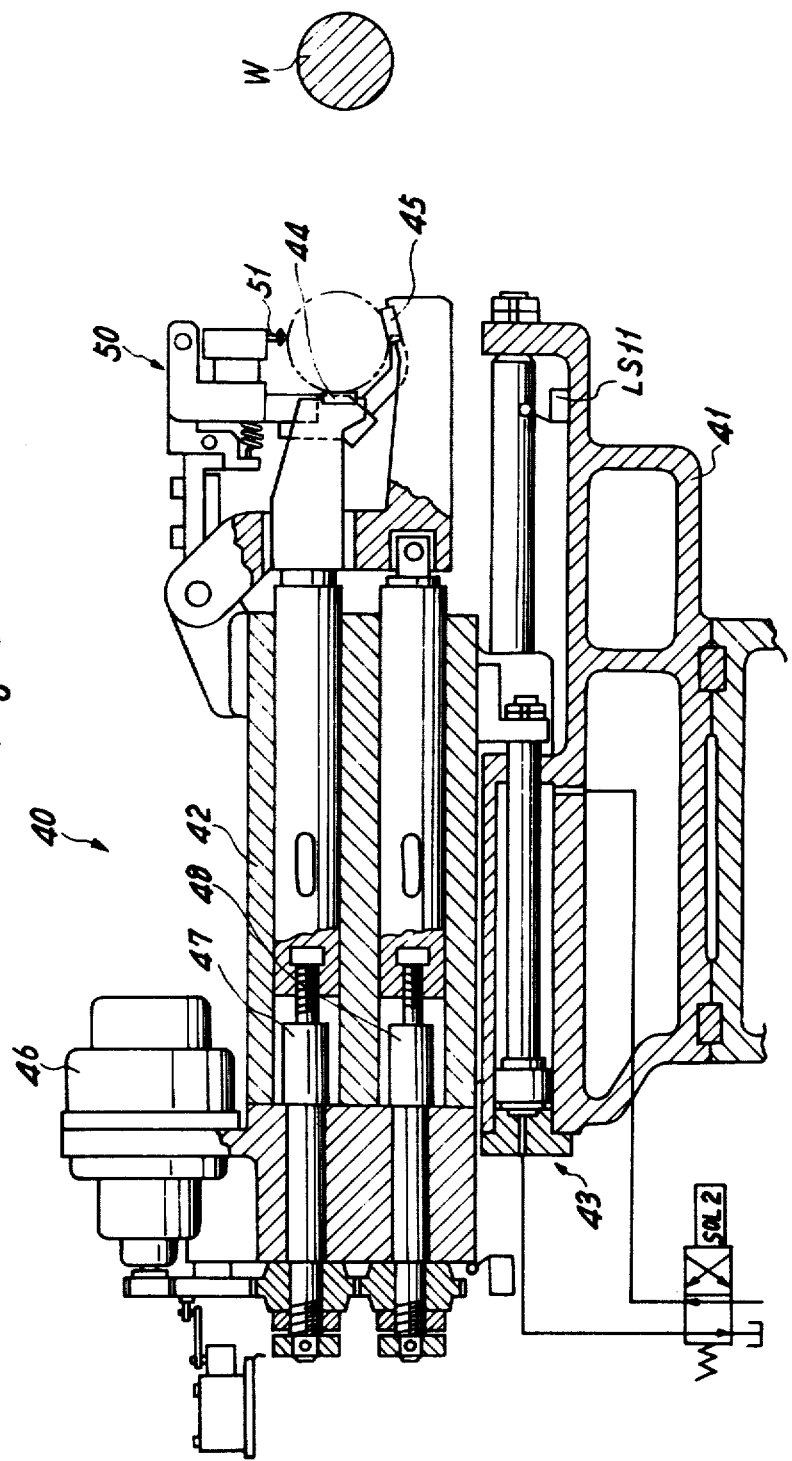

MACHINE TOOL WITH REST APPARATUS

BACKGROUND OF THE INVENTION

1. Field of the Invention

The present invention relates to a machine tool with rest apparatus and more particularly, concerns a machine tool with rest apparatus in which the feeding cycle of the rest apparatus towards the workpiece is changed in accordance with the rigidity of the portions to be machined.

2. Description of the Prior Art

It is well known that a rest apparatus is quite effective to improve machining accuracy. Therefore, various rest apparatus have been suggested and have been employed in practical use. In one type of prior art, rest apparatus, rest shoes are advanced toward a workpiece in conjunction with the feed of a tool toward the workpiece. When plural portions which are axially spaced from each other on one workpiece, such as for example, crank pins $P_1$, $P_2$, $P_3$ and $P_4$ of a crank shaft, as shown in FIG. 4, are required to be machined, the feed adjustment of the rest apparatus is most difficult. The best grinding operation cannot be expected when the rest shoes of the rest apparatus are always fed in the predetermined feeding cycle towards all of the crank pins $P_1$, $P_2$, $P_3$ and $P_4$, because the crank pins $P_1$ and $P_4$, which are close to pot chucks 8 and 9, are stronger in rigidity than the crank pins $P_2$ and $P_3$ which are remote from the pot chucks.

SUMMARY OF THE INVENTION

Accordingly, it is an object of the present invention to provide a machine tool with rest apparatus in which the relative feed between rest shoes of the rest apparatus and a tool is changed in accordance with the portions to be ground such that the machining operation is uniformly performed on all portions.

According to the present invention the above and other objects are achieved by providing a machine tool with rest apparatus including a base, a table slidably mounted on the base, workpiece supporting means mounted on the table for supporting a workpiece having at least first and second portions to be machined, tool supporting means slidably mounted on the base for supporting a tool, first drive means for performing relative movement between the tool supporting means and workpiece supporting means in order to perform a machining operation on the workpiece, rest apparatus mounted on the base for supporting the workpiece, second drive means for feeding the rest apparatus toward the workpiece in opposition to a force rendered to the workpiece by the tool, and control means for changing a feeding cycle of the rest apparatus in accordance with the portions to be machined.

BRIEF DESCRIPTION OF THE DRAWINGS

Other objects, features and attendant advantages of the present invention will be more fully appreciated as the same becomes better understood from the following detailed description when considered in connection with the accompanying drawings, wherein:

FIG. 3 shows a cross-section of a rest apparatus;

DETAILED DESCRIPTION OF THE PREFERRED EMBODIMENT

Figure 1:
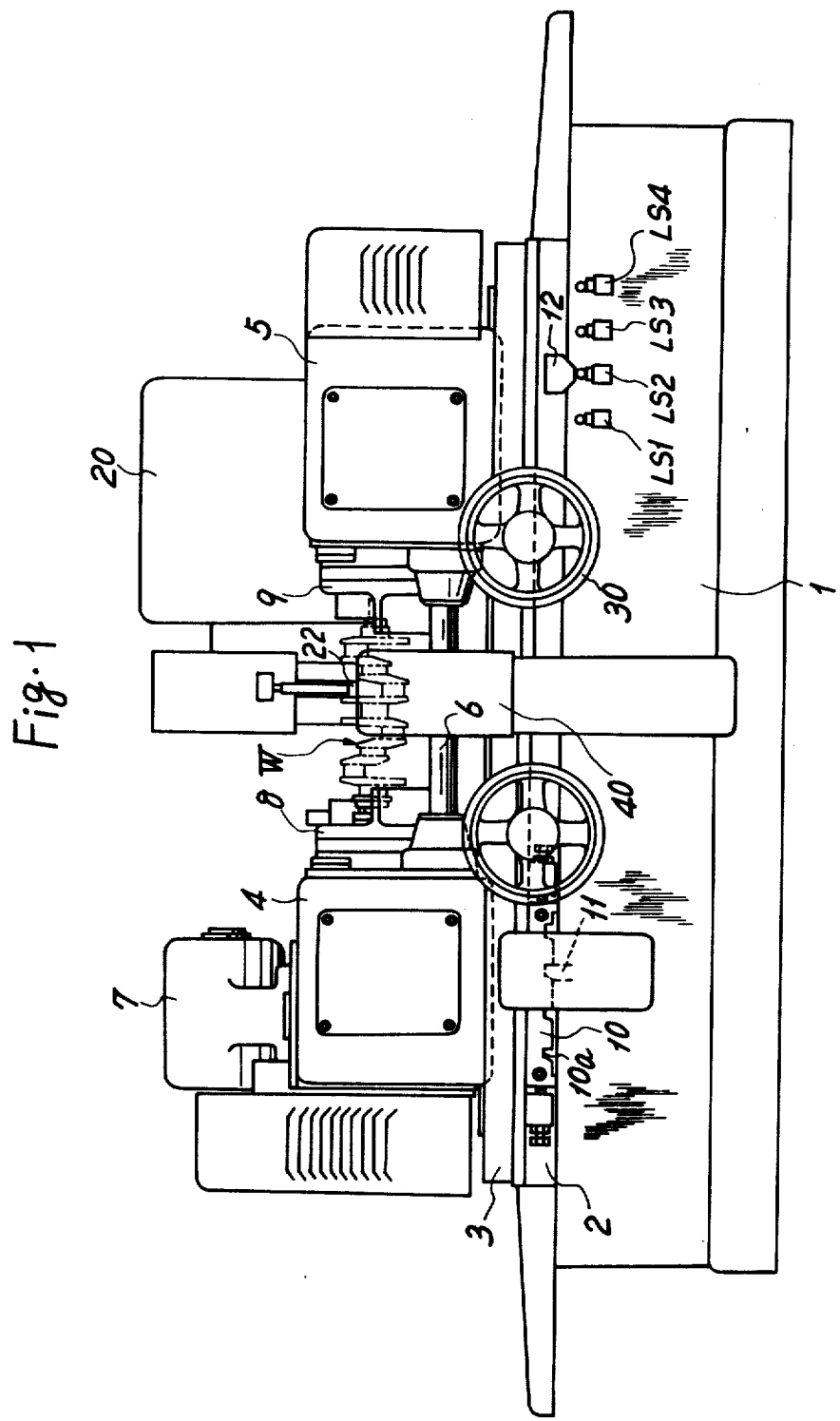
FIG. 1 shows a front view of a conventional crank pin grinding machine.

Referring now to FIG. 1 which shows a grinding machine for grinding pins of a crank shaft for an internal combustion engine, wherein the grinding machine includes a traverse table 2 slidably mounted on a bed 1. Pivotably mounted on the traverse table 2 is a swivel table 3 on which a head stock 4 and a tail stock 5 are, in turn, mounted in spaced relation to each other. Spindles (not shown) are rotatably mounted on the stocks 4 and 5 and are connected with each other by a synchronous shaft 6 which is also rotatably mounted on the stocks. The synchronous shaft 6 is operably connected with a drive motor 7 and the head stock 5 such that the spindles are synchronously rotated thereby.

Fixedly mounted on the front ends of the spindles are pot chucks 8 and 9 which may firmly hold a workpiece in such a manner that an axis of the pin of the workpiece is axially aligned with that of the spindles. Of course, the axes of the two spindles in the head stock 4 and the tail stock 5 are axially aligned with each other. A phase indexing mechanism (not shown) is provided in the head stock 4 and serves to angularly index the pins of the crank shaft W, one by one, such that the axis of the pin is aligned with the spindle axis.

The traverse table 2 is provided with a hydraulic actuator (not shown) which moves the table in a longitudinal direction thereof. A positioning plate 10, which is mounted on the traverse table 2, is provided with a plurality of notches 10a which are engageable with a knock pin 11 in order to axially index the pins of the crank shaft W. The space between each of the notches 10a is equal to the space between the pins of the crank shaft. A knock pin operating actuator (not shown) is provided on the bed 1 so as to actuate the knock pin 11.

A dog 12 is fixedly mounted on the traverse table 2 and a plurality of limit switches, LS1 to LS4 inclusive, are mounted on the bed 1. A wheel slide 20, which is movable in a direction perpendicular to the traverse table 2, is slidably mounted on the bed 1. A wheel spindle (not shown), rotatably mounted on the wheel slide 20, is provided with a grinding wheel 22 at one end thereof and is connected with a drive motor 21 on the wheel slide 20 at the other end thereof.

Figure 2:
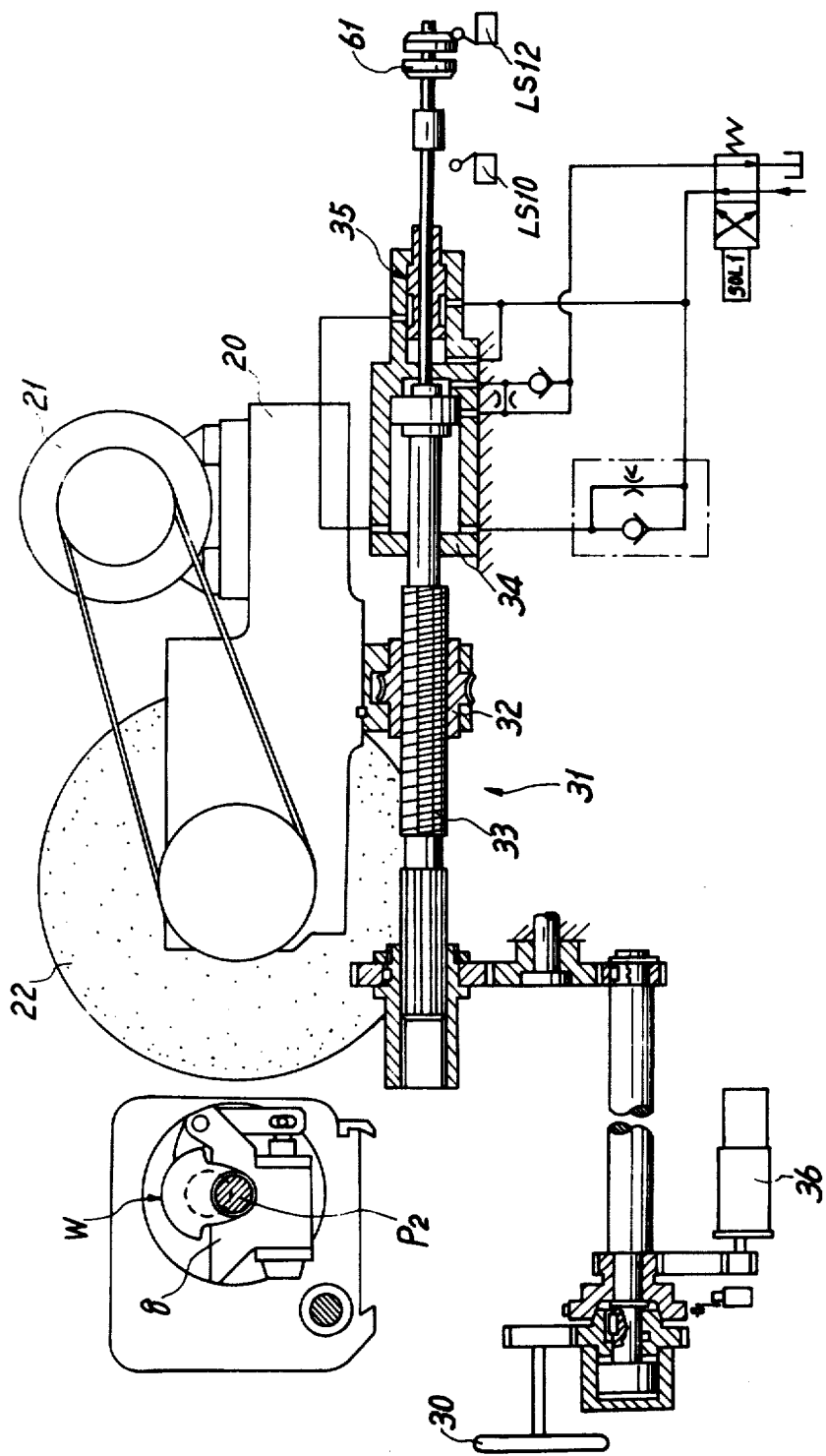
FIG. 2 shows a feed mechanism for a wheel slide.

Referring now to FIG. 2, a feed handle 30 is shown as being connected with a wheel slide feed mechanism 31 including a feed screw 33 threadably engaged with a feed nut 32 mounted on the underside of the wheel slide 20. A hydraulic actuator 34 is connected with the feed screw 33 and a shoulder feed mechanism 35 is provided to slow down the feed rate of the hydraulic actuator 34 for grinding the shoulder portion of the pin of the crank shaft. A stepping motor 36 is provided for rotating the feed screw 33 which in turn moves the wheel slide 20.

Figure 4:
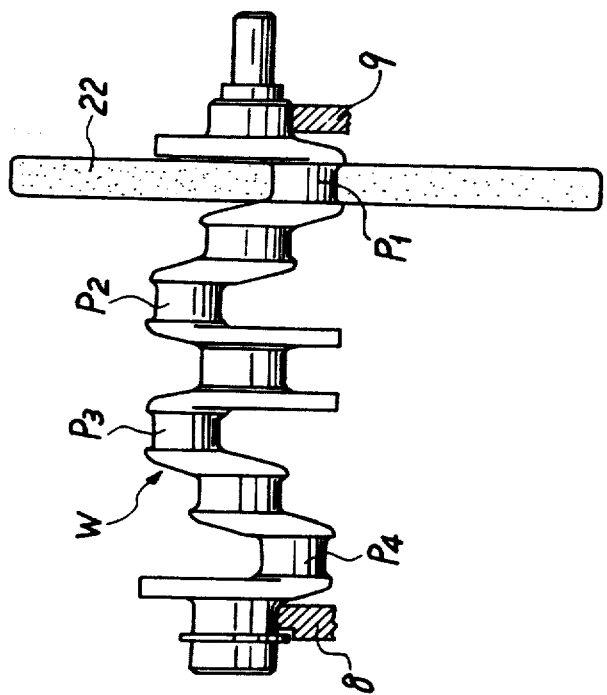
FIG. 4 shows one example of a crank shaft.

In order to grind the pins $P_1$–$P_4$ of the crank shaft W (as shown in FIG. 4) by the above described machine, the tranverse table 2 is longitudinally indexed to align a required pin with the grinding wheel 22 with the axis of the required pin being angularly aligned with the spindle axis. Thereafter, the crank shaft W is rotated by the drive motor 7 and the wheel slide 20 is advanced toward the workpiece W in order to grind the required pin by the grinding wheel 22.

While the grinding operation is being performed, the rest apparatus 40, which is provided on the bed 1, is utilized so as to oppose the grinding force, since the workpiece W is bent by the grinding resistance thereby reducing the machining accuracy.

Various kinds of rest apparatus can be used for supporting the crank shaft. A preferred embodiment of the rest apparatus, as shown in FIG. 3, includes a rest base 41 fixedly mounted on the bed 1, a rest housing 42 slidably mounted on the rest base 41, a hydraulic actuator 43 mounted on the rest base 41 for moving the rest housing 42 toward and away from the crank shaft W, and a stepping motor 46 for moving rest shoes 44 and 45 toward and away from the crank shaft W in vertical and horizontal directions respectively.

The machining accuracy is improved by the rest apparatus, but the best grinding operation cannot be achieved when the rest shoes 44 and 45 are always fed at the same predetermined feeding cycle toward all of the crank pins $P_1$–$P_4$ inclusive (as shown in FIG. 4), because the crank pins $P_1$–$P_4$ which are close to the pot chucks 8 and 9 have a stronger rigidity than the crank pins $P_2$ and $P_3$ which are remote from the pot chucks.

In the present invention, the relative feed rate between the rest apparatus and the grinding wheel is changed in accordance with the positions of the crank pins such that the crank pins are uniformly ground at all positions.

Figure 5:
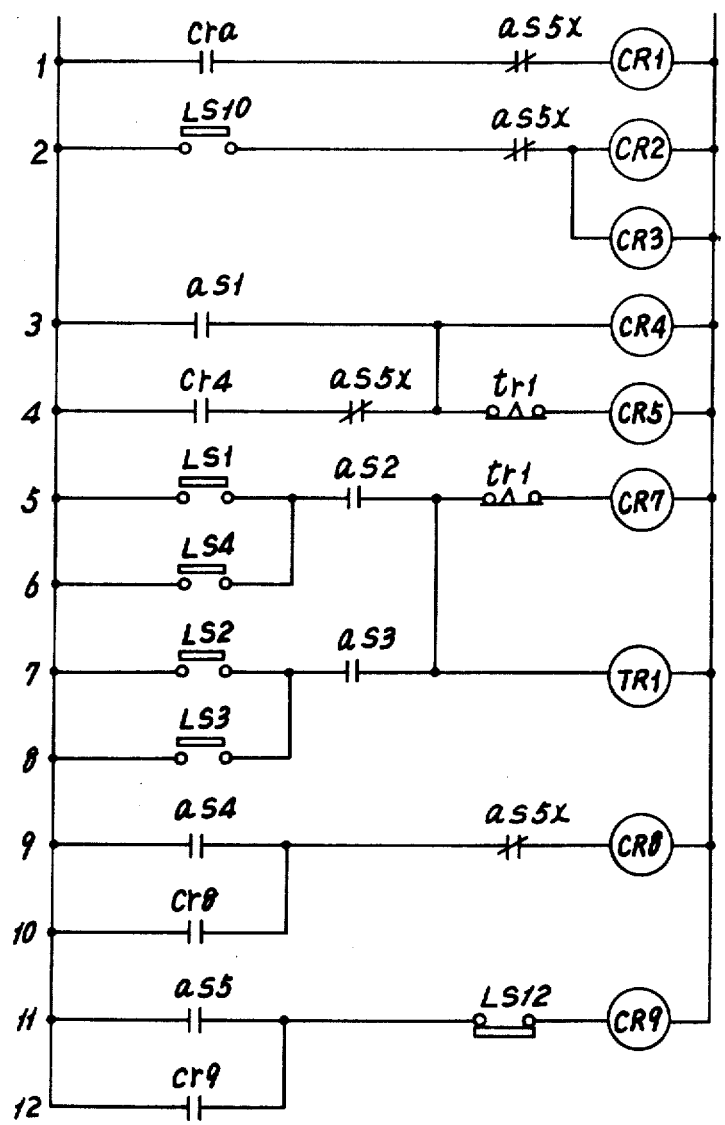
FIG. 5 is an electric circuit according to the present invention.

A preferred embodiment which is suitable for the grinding machine shown in FIG. 1 is described with reference to FIGS. 5 and 6 which are greatly simplified in order to expedite the understanding of the present invention.

A contact cra is closed by a grinding cycle start signal. A wheel slide rapid feed relay CR1 energizes a solenoid valve SOL 1 (FIG. 2) in order to change the direction of the pressurized fluid supplied to the hydraulic actuator 34. When a wheel slide rough grinding feed relay CR2 is energized, the wheel slide 20 is fed at the rough grinding feed relay CR2 is energized, the wheel slide 20 is fed at the rough grinding feed rate by the stepping motor 36 instead of the hydraulic actuator 34. A rest apparatus rapid feed relay CR3 initiates the feed of the rest apparatus by the hydraulic actuator 43 toward the workpiece W. A rest apparatus digital feed relay CR4 initiates the supply of digital signals to the stepping motor 46 in order to feed the rest shoes 44 and 45 by the digital signals. A feed stopping relay CR5 temporarily stops the feed of the wheel slide by the stepping motor. A rest shoe feed stopping relay CR7 ceases operation of the stepping motor 46. A feed restarting timer coil TR1 restarts operation of the stepping motor 36 by de-energizing the relay CR5. A relay CR8 changes the wheel slide feed into a fine grinding feed rate from the rough grinding feed rate. A relay CR9 initiates retraction of the wheel slide and the rest apparatus. Furthermore, reference numerals $as1$ to $as5$ inclusive indicate contacts which are operated by signals supplied from the sizing device 50 and are closed successively in accordance with the reduction in diameter. Contact $as5x$ is a normally closed contact and is opened only when a signal is being supplied from the sizing device.

Limit switches LS10 and LS12 are respectively provided for confirming the end of shoulder grinding feed and for confirming the retraction end of the wheel slide.

Figure 6:
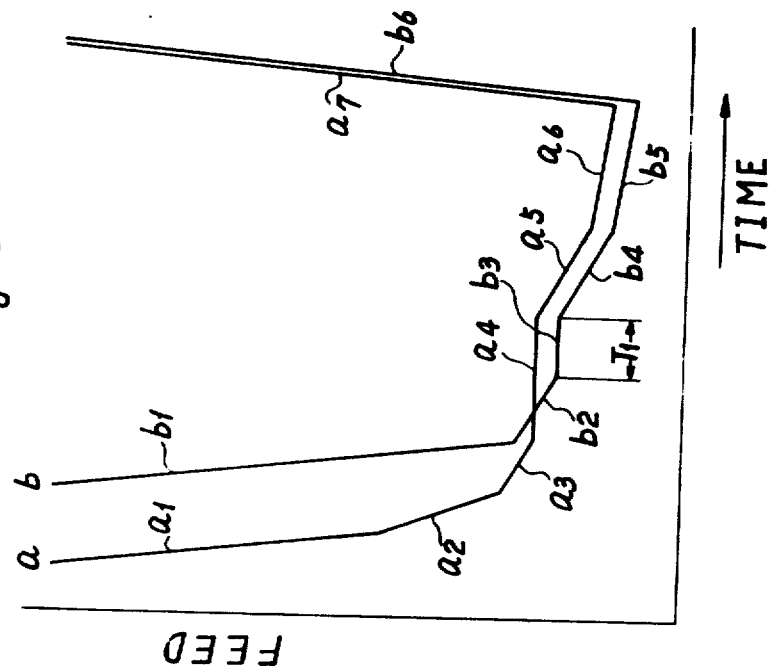
FIG. 6 is a cycle diagram performed by the electric circuit shown in FIG. 5.

When the contact cra is closed by a grinding cycle start signal, the relay CR1 is energized through the contact cra and the normally closed contact $as5x$, whereby the wheel slide 20 is advanced towards the crank pin at a rapid feed rate $a_1$ (as shown in FIG. 6) by the hydraulic actuator 34.

Toward the stroke end of the hydraulic actuator 34, the shoulder feed mechanism 35 is actuated and thus, the fluid evacuated from the hydraulic actuator 34 is restricted such that the feed rate is changed into a shoulder grinding feed rate $(a_2)$, at which feed rate the shoulder portion of the crank pin is ground by the grinding wheel 22. At the end of the shoulder grinding feed, the limit switch LS10 on a line 2 is closed by the dog 61 to thereby energize the relays CR2 and CR3 through the normally closed contact $as5x$. Since the relays CR5 and CR8 are still in de-energization, the stepping motor 36 is supplied with pulse signals of frequencies of rough grinding operation by the energization of the relay CR2 such that the rough grinding operation is performed on the crank pin by means of the stepping motor 36 $(a_3)$. When the relay CR3 is energized, a solenoid SOL2 (FIG. 3) is energized resulting in that the rest housing 42 is advanced toward the workpiece W by the hydraulic actuator 93 $(b_1)$. Accordingly, the probe 51 of the sizing device 50 is engaged with the crank pin and the output of a differential transformer, operably connected to the probe 51, is applied to a 5 stage Schmidt circuit.

When the rough grinding operation proceeds to thereby reduce the diameter of the crank pin into a predetermined value, the Schmidt circuit generates a first signal so as to close the contact $as1$ on line 3. Consequently, the relays CR4 and CR5 are energized and the energization thereof is self-held by means of the contact $cr4$ associated with the relay CR4 provided in parallel with the contact $as1$. By the energization of the relay CR5, the pulse signal supply to the stepping motor 36 ceases to thereby stop the feed of the wheel slide 20 $(a_4)$. Furthermore, the stepping motor 46 is supplied with electric pulse signals so as to move the supporting shoes 44 and 45 toward the center of the crank pin at the same feed rate as the rough grinding feed rate of the grinding wheel 20 $(b_2)$, since the relays CR7 and CR8 are not still energized. By the feed of the supporting shoes 44 and 45, the crank pin is further ground and the diameter thereof is, therefore, reduced.

When the diameter of the crank pin has been reduced to a predetermined value, the Schmidt circuit generates a second signal to thereby close the contact $as2$. When the grinding operation is performed on either the crank pin $P_1$ or $P_4$, the timer coil TR1 is closed through the contact $as2$ and the limit switch LS1 or LS4, since either the limit switch LS1 or LS4 is being closed. In addition, the relay CR7 is energized through the contact $tr1$ of the timer coil TR1.

When the grinding operation is performed on either the crank pin $P_2$ or $P_3$, that is, either the limit switch LS2 or LS3 is being closed, the Schmidt circuit generates a third signal to thereby close the contact $as3$ and therefore, the timer coil TR1 is energized through the contact $as3$ and the limit switch LS2 or LS3 and furthermore, the relay CR7 is energized through the contact tr1 of the timer coil TR1.

Upon energization of the relay CR7, the supply of pulse signals to the stepping motor is ceased ($b_3$).

It is to be noted that when the third signal is issued from the Schmidt circuit, the grinding operation has been further proceeded by the feed of the rest shoes 44 and 45 than at the time when the second signal is issued from the Schmidt circuit.

When a predetermined period of time has been lapsed, the contact tr1 of the timer coil TR1 is opened resulting in that the relays CR5 and CR7 are de-energized to thereby restart the feeds of the grinding wheel and the rest shoes ($a_5$) and ($b_4$).

It is to be noted that the pulse signals of frequencies corresponding to the rough grinding feed rate are simultaneously supplied to the stepping motors 36 and 46 so as to feed the grinding wheel 22 and the rest shoes 44 and 45, at the same feed rate since the relay CR2 is still being energized and the relay CR8 is still being de-energized.

When the diameter of the crank pin has been further reduced, the Schmidt circuit generates a fourth signal to thereby close the contact $as4$ and thus, the relay CR8 is closed through the contacts as $5x$ and $as4$ and is self-held by means of its associated contact $cr8$. Accordingly, the frequencies of the pulse signals supplied to the stepping motors 36 and 46 are changed into lower frequencies corresponding to the fine grinding operation such that the grinding wheel 22 and the rest shoes 44 and 45 are fed toward the crank pin at a fine grinding feed rate ($a_6$), ($b_5$).

When the crank pin has been ground into a predetermined final size, the Schmidt circuit provides a fifth signal to thereby open the contacts $as5x$ on lines 1, 2, 4 and 9 resulting in that the relay CR1 is de-energized to thereby retract the grinding wheel 20 at a rapid retraction rate by means of the hydraulic actuator 34. The sizing device 50 and the rest housing 42 are retracted at the rapid retraction rate by the de-energization of the relay CR3. Furthermore, the pulse signals of high frequencies are supplied to the stepping motors 36 and 46 by the de-energization of the relays CR2 and CR4 to thereby retract the wheel slide 20 and the rest shoes 44 and 45 to their original positions.

The timer coil TR1 is de-energized such that the probe 51 of the sizing device 50 is disengaged from the crank pin to thereby open the contacts $as2$ and $as3$. The relay CR9 is also de-energized by the opening of the limit switch LS12 due to the retraction of the wheel slide 20 to its original position.

According to the present invention, as described in detail, the feed amount of the rest shoes are changed in accordance with the portions to be ground whereby the deviation of the axis of the crank pin from the axis of the spindle is reduced so as to have the grinding operation performed on all the crank pins uniformly. Accordingly, the machining accuracy by this machine is heightened into the maximum stage.

Although certain specific embodiments of the invention have been shown and described, it is obvious that many modifications and variations thereof are possible in light of the above teachings. It is to be understood therefore, that within the scope of the appended claims, the invention may be practiced otherwise than as specifically described herein.

What is claimed as new and desired to be secured by letters patent of the United States is:

1. A machine tool with rest apparatus comprising,
    a base,
    a table slidably mounted on said base,
    workpiece supporting means mounted on said table for supporting a workpiece having at least first and second axially spaced portions to be machined,
    tool supporting means slidably mounted on said base for supporting a tool,
    first drive means for creating a relative movement between said tool supporting means and workpiece supporting means in order to perform a machining operation on the workpiece,
    rest apparatus mounted on said base for supporting the workpiece,
    second drive means for feeding said rest apparatus toward the workpiece in opposition to a force rendered to the workpiece by said tool, and
    control means for changing the rate of the feeding cycle of said rest apparatus in response to the axial portion to be machined.

2. A machine tool according to claim 1, wherein said control means comprises:
    detecting means for detecting the portion to be machined,
    a sizing device for generating a plurality of signals in accordance with the reduction of the portion to be machined, and
    switching means for controlling the feeding cycle of said rest apparatus in response to said detecting means and said sizing device.

3. A machine tool according to claim 2, wherein said detecting means comprises a plurality of limit switches which are spaced from one another by a distance corresponding to a distance between the portions to be machined.

4. A machine tool according to claim 1, wherein said first and second drive means are digital stepping motors.

5. A machine tool according to claim 2, wherein said switching means comprises,
    first means responsive to a first signal from said sizing device for stopping the operation of said first drive means and for driving said second drive means at a first feed rate.

6. A machine tool according to claim 5, wherein said switching means further comprises:
    second means responsive to a second signal from said sizing device for stopping the operation of said second drive means and irresponsive to a third signal from said sizing device when said detecting means indicates the first portion being machined.

7. A machine tool according to claim 6, wherein said second means is responsive to the third signal for stopping the operation of said second drive means and irresponsive to the second signal when said detecting means indicates the second portion being machined.

8. A machine tool according to claim 7, wherein said sizing device generates the third signal when the machining operation has further proceeded after the second signal.

9. A machine tool according to claim 5, wherein said switching means further comprises third means for restarting the operations of said first and second drive means when a predetermined period has been lapsed after the operation of said second drive means is stopped.

* * * * *